(12) United States Patent
Berger

(10) Patent No.: US 9,776,675 B1
(45) Date of Patent: Oct. 3, 2017

(54) VEHICLE WING WITH POSITION-MAINTAINING ENDPLATES

(71) Applicant: GM Global Technology Operations LLC, Detroit, MI (US)

(72) Inventor: Richard A. Berger, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/157,429

(22) Filed: May 18, 2016

(51) Int. Cl.
  *B62D 37/02* (2006.01)
  *B62D 35/00* (2006.01)

(52) U.S. Cl.
  CPC .......... *B62D 35/007* (2013.01); *B62D 37/02* (2013.01)

(58) Field of Classification Search
  CPC .............................. B62D 35/007; B62D 37/02
  USPC ....................................................... 296/180.5
  See application file for complete search history.

(56) References Cited

U.S. PATENT DOCUMENTS

| | | | | |
|---|---|---|---|---|
| 3,791,468 A * | 2/1974 | Bryan, Jr. | ............ | B62D 37/02 105/1.3 |
| 4,810,022 A * | 3/1989 | Takagi | ............ | B62D 35/005 180/197 |
| 7,172,236 B1 * | 2/2007 | Chevtsov | ............ | B60J 7/1678 296/107.17 |
| 7,578,543 B2 * | 8/2009 | Wegener | ............ | B62D 35/007 296/180.3 |
| 7,665,796 B2 * | 2/2010 | Wegener | ............ | B62D 35/007 180/903 |
| 7,708,335 B2 * | 5/2010 | Wegener | ............ | B60T 1/16 296/180.1 |
| 7,854,467 B2 * | 12/2010 | McKnight | ............ | F15D 1/10 296/180.1 |
| 8,960,770 B2 * | 2/2015 | De Luca | ............ | B62D 35/007 296/180.5 |
| 9,403,564 B1 * | 8/2016 | Al-Huwaider | ............ | B62D 35/007 |
| 9,630,661 B1 * | 4/2017 | Willard | ............ | B62D 35/007 |
| 9,662,967 B2 * | 5/2017 | Rutschmann | ............ | B60K 13/02 |

* cited by examiner

*Primary Examiner* — Pinel Romain

(57) ABSTRACT

A wing assembly for a vehicle includes a pivotable elongate wing member. The wing member extends from a first end to a second end, and is configured to pivot relative to a pivot axis between a first position and a second position. The pivot axis extends from the first end to the second end. The wing assembly further includes a first endplate pivotably coupled to the first end and a second endplate pivotably coupled to the second end. The first endplate has a first endplate position relative to the pivot axis, and is configured to maintain the first endplate position independent of wing member position. The second endplate has a second endplate position relative to the pivot axis, and is configured to maintain the second endplate position independent of wing member position.

20 Claims, 3 Drawing Sheets

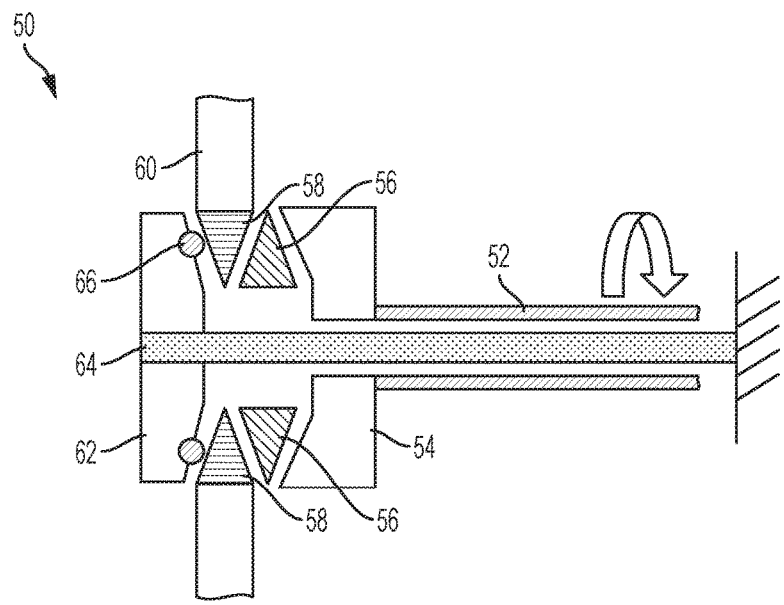
FIG. 3
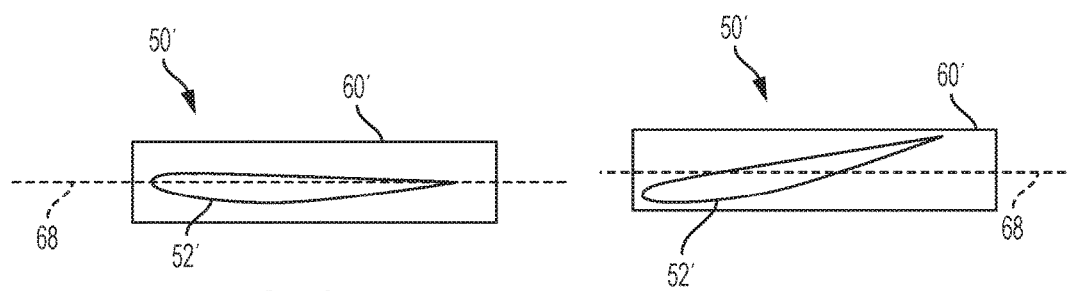
FIG. 4A
FIG. 4B

VEHICLE WING WITH POSITION-MAINTAINING ENDPLATES

TECHNICAL FIELD

The present disclosure relates to a wing for a vehicle, particularly a rear wing having endplates for an automotive vehicle.

INTRODUCTION

In many automotive vehicles, typical vehicle design results in turbulence being generated along the length of the car, particularly above the rear portion. The reduction in pressure caused by the turbulence and other effects may, in turn, result in a lift force affecting the rear portion. Moreover, in many vehicles the engine is positioned in a front portion of the car, resulting in a forward-positioned center of gravity. The combination of rearward-positioned lift force and forward-positioned center of gravity may result in the rear portion of the car drifting toward the outside of high-speed turns. This phenomenon is known as oversteer. In high performance vehicles, a rear wing may be added to the rear portion in order to generate a downforce to counteract the lift.

SUMMARY

An automotive vehicle according to the present disclosure includes a body. The body has a body having a front portion, a rear portion, a driver side, and a passenger side. The vehicle additionally includes a rear wing. The rear wing is pivotably coupled to the rear portion. The rear wing has a first end on the driver side and a second end on the passenger side. The rear wing is configured to pivot relative to a pivot axis extending from the first end to the second end. The wing includes a first endplate. The first endplate is pivotably coupled to the first end. The first endplate extends in a first plane generally orthogonal to the pivot axis and has a first endplate angular position relative to the pivot axis. The wing further includes a second endplate. The second endplate is pivotably coupled to the second end. The second endplate extends in a second plane generally orthogonal to the pivot axis and has a second endplate angular position relative to the pivot axis. The rear wing is pivotable between a first position and a second position with the first endplate maintained in the first endplate angular position and the second endplate maintained in the second endplate angular position. The first and second endplates may be spaced from the vehicle body.

According to various embodiments, the vehicle further includes a first gearing assembly and a second gearing assembly. The first gearing assembly couples the rear wing to the first endplate. The first gearing assembly is configured to maintain the first endplate at the first endplate angular position independent of rear wing position. The second gearing assembly couples the rear wing to the second endplate. The second gearing assembly is configured to maintain the second endplate at the second endplate angular position independent of rear wing position.

In some embodiments, the rear wing includes a first plurality of teeth at the first end and a second plurality of teeth at the second end. The first gearing assembly includes a first counter-sprocket in meshing engagement with the first plurality of teeth and a first driven sprocket in meshing engagement with the first counter-sprocket, and the first driven sprocket is fixedly coupled to the first endplate. The second gearing assembly includes a second counter-sprocket in meshing engagement with the second plurality of teeth and a second driven sprocket in meshing engagement with the second counter-sprocket, and the second driven sprocket is fixedly coupled to the second endplate.

According to various embodiments, the vehicle further includes a first mass coupled to the first endplate and a second mass coupled to the second endplate. The first endplate is pivotable independent of rear wing position, and the first mass is offset from the pivot axis to maintain the first endplate in the first angular position. The second endplate is pivotable independent of rear wing position, and the second mass is offset from the pivot axis to maintain the second endplate at the second endplate angular position.

According to various embodiments, the vehicle further includes a first electric motor having a first output shaft coupled to the first endplate and a second electric motor having a second output shaft coupled to the second endplate. The first endplate is pivotable independent of rear wing position, and the first motor is configured to maintain the first endplate in the first angular position. The second endplate is pivotable independent of rear wing position, and the second motor is configured to maintain the second endplate at the second endplate angular position.

According to various embodiments, the first endplate is spaced from the body and the second endplate is spaced from the body. The first endplate may be parallel to the second endplate.

According to various embodiments, the rear wing has a pressure surface and a suction surface, the pressure surface being disposed at an upper portion of the wing and the suction surface being disposed at a lower portion of the wing.

A wing assembly for a vehicle according to the present disclosure includes a pivotable elongate wing member. The wing member extends from a first end to a second end, and is configured to pivot relative to a pivot axis between a first position and a second position. The pivot axis extends from the first end to the second end. The wing assembly further includes a first endplate pivotably coupled to the first end and a second endplate pivotably coupled to the second end. The first endplate has a first endplate position relative to the pivot axis, and is configured to maintain the first endplate position independent of wing member position. The second endplate has a second endplate position relative to the pivot axis, and is configured to maintain the second endplate position independent of wing member position.

According to various embodiments, the wing assembly additionally includes a first gearing assembly and a second gearing assembly. The first gearing assembly is configured to cooperate with the wing member and the first endplate to maintain the first endplate position independent of wing member position, and the second gearing assembly is configured to cooperate with the wing member and the second endplate to maintain the second endplate position independent of wing member position.

In some embodiments, the wing member includes a first plurality of teeth at the first end and a second plurality of teeth at the second end. The first gearing assembly includes a first counter-sprocket in meshing engagement with the first plurality of teeth and a first driven sprocket in meshing engagement with the first counter-sprocket. The first driven sprocket is fixedly coupled to the first endplate. The second gearing assembly includes a second counter-sprocket in meshing engagement with the second plurality of teeth and a second driven sprocket in meshing engagement with the second counter-sprocket. The second driven sprocket is fixedly coupled to the second endplate.

According to various embodiments, the wing assembly additionally includes a first mass coupled to the first endplate and a second mass coupled to the second endplate. The first endplate is pivotable independent of wing member position, and the first mass is offset from the pivot axis to maintain the first endplate in the first angular position. The second endplate is pivotable independent of wing member position, and the second mass is offset from the pivot axis to maintain the second endplate at the second endplate angular position.

According to various embodiments, the wing assembly additionally includes a first electric motor having a first output shaft coupled to the first endplate and a second electric motor having a second output shaft coupled to the second endplate. The first endplate is pivotable independent of wing member position, and the first motor is configured to maintain the first endplate in the first angular position. The second endplate is pivotable independent of wing member position, and the second motor is configured to maintain the second endplate at the second endplate angular position.

According to various embodiments, the wing member is pivotably coupled to a stanchion disposed at a rear portion of an automotive vehicle.

A vehicle according to the present disclosure includes a vehicle body. The body has a driver side, a passenger side, and a lateral axis extending from the driver side to the passenger side. The vehicle additionally includes a stanchion coupled to the body. The vehicle also includes an elongate aerodynamic wing member pivotably coupled to the stanchion. The vehicle further includes a first endplate and a second endplate. The first endplate is pivotably coupled to the wing member about a first pivot axis. The first pivot axis is generally parallel to the lateral axis. The second endplate is pivotably coupled to the wing member about a second pivot axis. The second pivot axis is generally parallel to the lateral axis. The first endplate is spaced from the vehicle body and the second endplate is spaced from the vehicle body.

According to various embodiments, the first pivot axis is coaxial with the second pivot axis. The first endplate may extend in a first plane generally orthogonal to the first pivot axis, and the second endplate may extend in a second plane generally orthogonal to the second pivot axis. The vehicle may be an automotive vehicle.

According to an exemplary embodiment, the first endplate has a predefined first angular position relative to the first pivot axis, and the second endplate has a predefined second angular position relative to the second pivot axis. The first endplate is configured to maintain the first angular position as the wing member pivots relative to the first pivot axis. The second endplate is configured to maintain the second angular position as the wing member pivots relative to the second pivot axis.

According to various embodiments, the vehicle additionally includes a first gearing assembly and a second gearing assembly. The first gearing assembly couples the wing member to the first endplate. The first gearing assembly is configured to maintain the first endplate at the first angular position as the wing member pivots relative to the first pivot axis. The second gearing assembly couples the wing member to the second endplate. The second gearing assembly is configured to maintain the second endplate at the second angular position as the wing member pivots relative to the second pivot axis.

Embodiments according to the present disclosure provide a number of advantages. For example, the present disclosure provides a rear wing having endplates which maintain a consistent angular position relative to a ground plane, thus providing desirable aesthetic effects and maintaining consistent aerodynamic performance.

The above advantage and other advantages and features of the present disclosure will be apparent from the following detailed description of the preferred embodiments when taken in connection with the accompanying drawings.

BRIEF DESCRIPTION OF THE DRAWINGS

FIG. 3 is a schematic representation of a rear wing assembly according to the present disclosure;

FIGS. 4A and 4B are schematic representations of a rear wing according to the present disclosure;

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
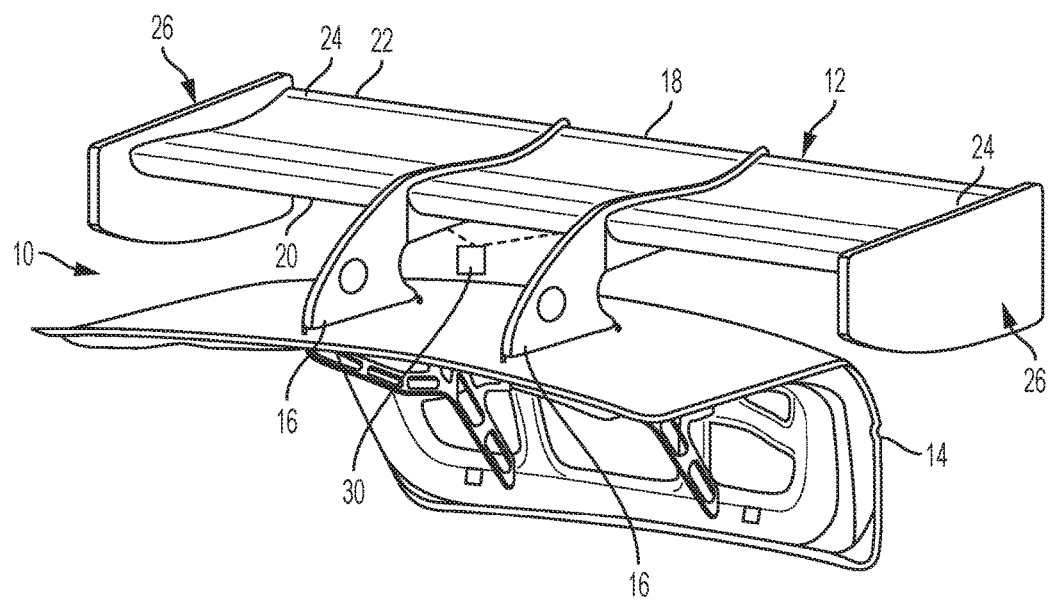
FIG. 1 is an isometric view of a rear wing for an automotive vehicle.

Referring now to FIG. 1, an isometric view of a rear wing 12 for an automotive vehicle 10 is shown. The rear wing 12 is coupled to a rear portion 14 of the vehicle 10 by at least one stanchion 16. The rear wing 12 includes an elongate aerodynamic member or airfoil 18. The airfoil 18 has a suction surface 20 facing a ground plane and a pressure surface 22 facing away from a ground plane. Thus, as air flows over the rear wing 12, a pressure differential between the pressure surface 22 and the suction surface 20 arises, and a downforce is exerted on the rear portion 14 of the vehicle 10.

Due to the pressure differential between the pressure surface 22 and the suction surface 20, air may spill around ends 24 of the airfoil 18. Such air spillage induces vortices in the air, increases drag, and reduces downforce. To inhibit air spillage from the pressure surface 22 to the suction surface 20, endplates 26 are provided at the ends 24 of the airfoil 18. The endplates 26 may be spaced from, e.g. do not directly contact, the body of the vehicle 10. The endplates 26 are generally planar, and extend generally orthogonal to the airfoil 18. The endplates 26 may be generally parallel to one another, or may be canted inward or outward relative to a longitudinal centerline of the vehicle 10.

The endplates 26 may be designed to satisfy not only aerodynamic but also aesthetic considerations. As an example, ornamental features may be placed on outer faces of the endplates 26. As another example, the shape of the endplates 26 as seen in profile may be designed for a desired aesthetic property.

At least one actuator 30 is arranged to pivot the airfoil 18, e.g. to adjust an angle of attack of the airfoil 18. According to various embodiments, the actuator 30 may be configured to pivot the airfoil 18 relative to the stanchions 16, to pivot one portion of the stanchions 16 relative to another portion of the stanchions 16, or other appropriate configuration for adjusting the angle of attack of the airfoil 18. The actuator 30 may be controlled by a controller (not shown) to pivot the airfoil 18 between different positions during a drive cycle in response to, for example, vehicle speed and lateral acceleration. By pivoting the airfoil 18, the downforce and drag generated by the airfoil 18 may be optimized based on current operating conditions.

Figures 2A, 2B:
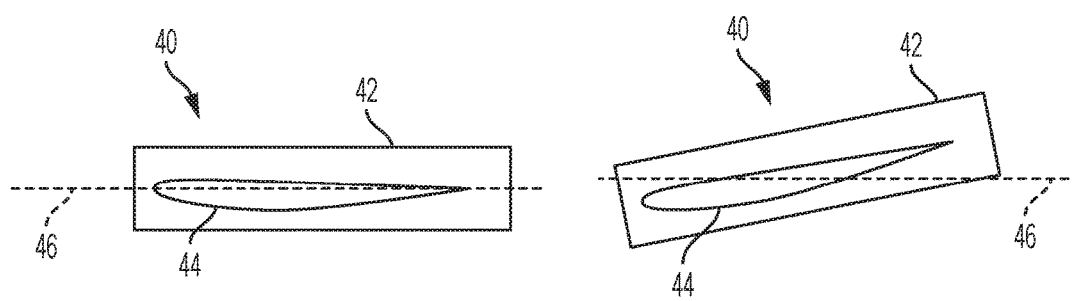
FIGS. 2A and 2B are schematic representations of a prior art rear wing.

Referring now to FIGS. 2A and 2B, pivoting motion of a rear wing 40 having endplates 42 of a known design is illustrated schematically. According to known designs, the endplates 42 are fixedly coupled to an airfoil 44. Thus, as the airfoil 44 pivots between an initial position with respect to a plane 46, illustrated in FIG. 2A, and a pivoted position with respect to the plane 46, illustrated in FIG. 2B, the endplates 42 likewise pivot between the initial position and the pivoted position. The plane 46 is parallel to a ground plane, e.g. the plane defined by the contact points between vehicle wheels and the road. As may be seen, as the airfoil 44 pivots between the initial position and the pivoted position, the orientation of the endplates 42 as viewed from an observer is changed.

Referring now to FIG. 3, an exemplary embodiment of a rear wing assembly according to the present disclosure is illustrated schematically. The rear wing assembly 50 includes an airfoil 52. The airfoil 52 has a free end 54 provided with a plurality of teeth. The teeth of the free end are in meshing engagement with counter sprockets 56. The counter sprockets 56 are, in turn, in meshing engagement with driven sprockets 58. The driven sprockets 58 are fixedly coupled to an endplate 60. The driven sprockets 58 are retained in meshing engagement with the counter sprockets 56 by an end cap 62. The end cap 62 is fixedly coupled to a mounting shaft 64. The mounting shaft 64 is fixedly held against rotation relative to the vehicle body, e.g. by being secured to a structural support. A bearing assembly 66 is provided between the end cap 62 and the driven sprockets 58. The bearing assembly 66 permits the endplate 60 to rotate relative to the mounting shaft.

As the airfoil 52 is pivoted relative to the mounting shaft 64, the teeth at the free end 54 drive the counter sprockets 56, which in turn drive the driven sprockets 58. The endplate 60 thus rotates about the end shaft 64 in a direction opposite the pivoting motion of the airfoil 52. The magnitude of relative rotation may be calibrated by appropriate selection of tooth numbers of the free end 54, counter sprockets 56, and driven sprockets 58. Thus, when the airfoil 52 is pivoted, the endplate 60 is pivoted in an opposite direction.

In an exemplary embodiment, the endplate 60 is pivoted in the opposite direction by an angular quantity approximately equal to the pivoting angle of the airfoil 52. In such an embodiment, the endplate 60 is maintained at a consistent angular position relative to the ground plane.

While only one endplate 60 is depicted in FIG. 3, it should be understood that a similar arrangement is provided for an additional endplate at an opposite end of the airfoil 52.

Referring now to FIGS. 4A and 4B, pivoting motion of a rear wing 50' having endplates 60' according to the present disclosure is illustrated schematically. As an airfoil 52' pivots between an initial position with respect to a plane 68, illustrated in FIG. 2A, and a pivoted position with respect to the plane 68, illustrated in FIG. 4B, the endplates 60' pivot relative to the airfoil 52' in a direction opposite the pivoting motion of the airfoil 52'. As may be seen, as the airfoil 52' pivots between the initial position and the pivoted position, the orientation of the endplates 60' as viewed from an observer remains generally constant.

Advantageously, the side profile of the endplate thus remains generally unchanged as the airfoil rotates. Any aesthetic or ornamental features thus remain consistent as the airfoil pivots. Furthermore, the leading edge of the endplate is maintained in a consistent position relative to the flow of air, providing consistent aerodynamic performance as the airfoil pivots.

Figure 5:
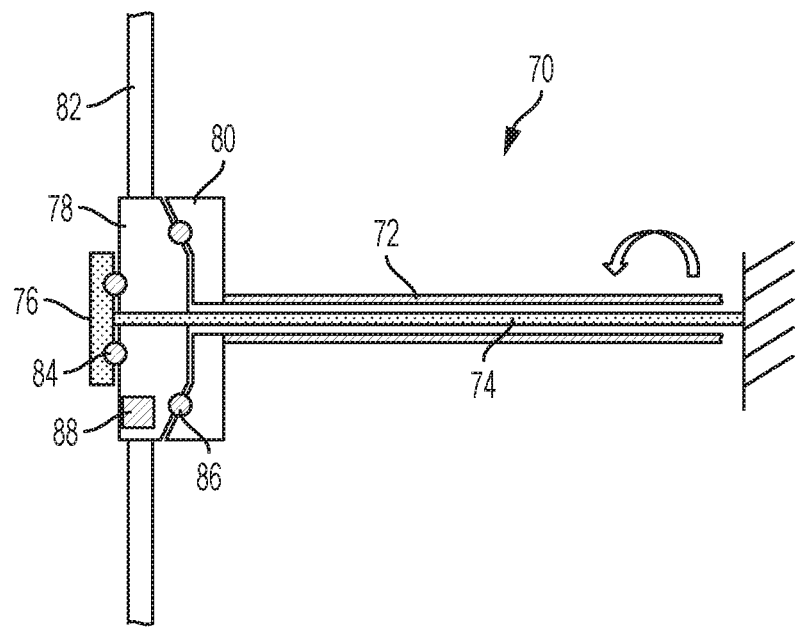
FIG. 5 is a schematic representation of an alternative embodiment of a rear wing according to the present disclosure.

Referring now to FIG. 5, an alternative embodiment is schematically illustrated. In this embodiment, a rear wing assembly 70 includes an airfoil 72. A mounting shaft 74 is disposed within the airfoil 72 and is fixedly held against rotation relative to the vehicle body, e.g. by being secured to a structural support. An end cap 76 is fixedly coupled a free end of the mounting shaft 74. A rotatable hub assembly 78 is retained between the end cap 76 and a free end 80 of the airfoil 72. The hub assembly 78 is fixedly coupled to an endplate 82. A first bearing 84 is disposed between the hub assembly 78 and the end cap 76, and a second bearing 86 is disposed between the hub assembly 78 and the free end 80 of the airfoil 72. The hub assembly 78 may rotate about the mounting shaft 74 with respect to the end cap 76 and with respect to the free end 80. An offset weight 88 is coupled to the hub assembly 78. The weight 88 is offset from the mounting shaft 74, such that the portion of the hub assembly 78 coupled to the weight 88 is maintained in a downward position due to gravitational force. The weight 88 may be a solid mass, a fluid-filled volume, or other appropriate mass. According to some embodiments, the weight 88 may be integrated into the hub assembly 78, e.g. by providing one region of the hub assembly 78 with increased material thickness to increase weight.

As may be seen, as the airfoil 72 is pivoted, the hub assembly 78 may rotate relative to the airfoil 72 and the end cap 76 to maintain the endplate 82 in a consistent angular position relative to the ground plane.

Figure 6:
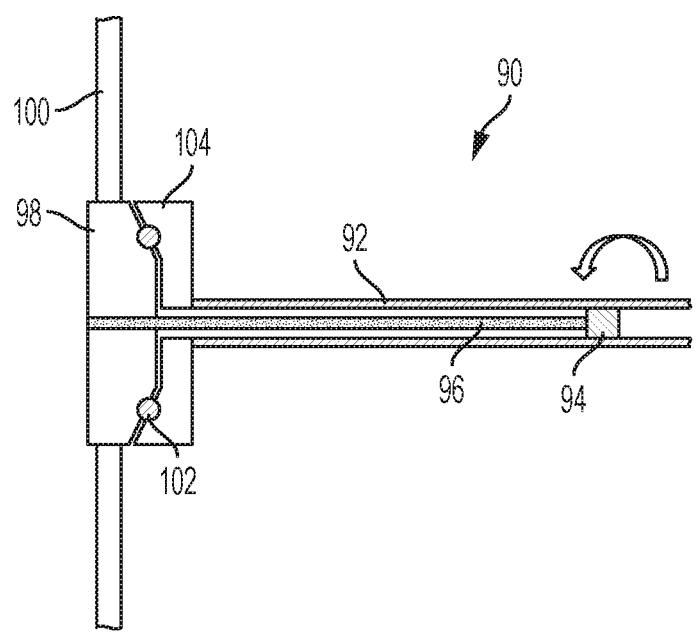
FIG. 6 is a schematic representation of an additional alternative embodiment of a rear wing according to the present disclosure.

Referring now to FIG. 6, another alternative embodiment is schematically illustrated. In this embodiment, a rear wing assembly 90 includes an airfoil 92. An electric motor 94 is retained within the airfoil 92. The electric motor 94 has an output shaft 96. The output shaft 96 is fixedly coupled to a hub assembly 98. The hub assembly 98 is fixedly coupled to an endplate 100. A bearing 102 is disposed between the hub assembly 98 and a free end 104 of the airfoil 92.

As the airfoil 92 is pivoted, the electric motor 94 may drive the output shaft 96 to pivot the endplate 100 in a direction opposite the pivoting motion of the airfoil 92. In an exemplary embodiment, a controller may control the electric motor to pivot the endplate 100 in the opposite direction by an angular quantity approximately equal to the pivoting angle of the airfoil 92. In such an embodiment, the endplate 100 is maintained at a consistent angular position relative to the ground plane.

Additional variations of the above are also contemplated within the scope of the present disclosure. For example, endplates as discussed above may be used in conjunction with lift wings and/or wings used in other types of vehicles or at other locations on the vehicle. As another example, gearing or motors may be controlled to reduce, but not eliminate, pivoting of the endplates as the wing pivots. In such embodiments, the endplates are not maintained at a predefined angular position, but rather are pivoted a lesser quantity than the pivoting of the wing.

As may be seen, the present disclosure provides a rear wing having endplates which maintain a consistent angular position relative to a ground plane, thus providing desirable aesthetic effects and maintaining consistent aerodynamic performance While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
   a body having a front portion, a rear portion, a driver side, and a passenger side;
   a rear wing pivotably coupled to the rear portion, the rear wing having a first end on the driver side and a second end on the passenger side, the rear wing being configured to pivot relative to a pivot axis extending from the first end to the second end;
   a first endplate pivotably coupled to the first end, the first endplate extending in a first plane generally orthogonal to the pivot axis and having a first endplate angular position relative to the pivot axis; and
   a second endplate pivotably coupled to the second end, the second endplate extending in a second plane generally orthogonal to the pivot axis and having a second endplate angular position relative to the pivot axis;
   wherein the rear wing is pivotable between a first position and a second position with the first endplate maintained in the first endplate angular position and the second endplate maintained in the second endplate angular position.

2. The vehicle of claim 1, further comprising:
   a first gearing assembly coupling the rear wing to the first endplate, the first gearing assembly being configured to maintain the first endplate at the first endplate angular position independent of a rear wing position; and
   a second gearing assembly coupling the rear wing to the second endplate, the second gearing assembly being configured to maintain the second endplate at the second endplate angular position independent of the rear wing position.

3. The vehicle of claim 2, wherein the rear wing includes a first plurality of teeth at the first end and a second plurality of teeth at the second end, wherein the first gearing assembly includes a first counter-sprocket in meshing engagement with the first plurality of teeth and a first driven sprocket in meshing engagement with the first counter-sprocket, the first driven sprocket being fixedly coupled to the first endplate, and wherein the second gearing assembly includes a second counter-sprocket in meshing engagement with the second plurality of teeth and a second driven sprocket in meshing engagement with the second counter-sprocket, the second driven sprocket being fixedly coupled to the second endplate, such that pivoting of the rear wing in a first direction drives the first driven sprocket and the second driven sprocket in a second direction opposite the first direction.

4. The vehicle of claim 1, further comprising a first mass coupled to the first endplate and a second mass coupled to the second endplate, wherein the first endplate is pivotable independent of rear wing position and the first mass is offset from the pivot axis to maintain the first endplate in the first endplate angular position, and wherein the second endplate is pivotable independent of rear wing position and the second mass is offset from the pivot axis to maintain the second endplate at the second endplate angular position.

5. The vehicle of claim 1, further comprising a first electric motor having a first output shaft coupled to the first endplate and a second electric motor having a second output shaft coupled to the second endplate, wherein the first endplate is pivotable independent of rear wing position and the first motor is configured to maintain the first endplate in the first endplate angular position, and wherein the second endplate is pivotable independent of rear wing position and the second motor is configured to maintain the second endplate at the second endplate angular position.

6. The vehicle of claim 1, wherein the first endplate is spaced from the body and the second endplate is spaced from the body.

7. The vehicle of claim 1, wherein the rear wing has a pressure surface and a suction surface, the pressure surface being disposed at an upper portion of the wing and the suction surface being disposed at a lower portion of the wing.

8. The vehicle of claim 1, wherein the first endplate is parallel to the second endplate.

9. A wing assembly for a vehicle, comprising:
   a pivotable elongate wing member extending from a first end to a second end, the wing member being configured to pivot relative to a pivot axis between a first position and a second position, the pivot axis extending from the first end to the second end;
   a first endplate pivotably coupled to the first end, the first endplate having a first endplate position relative to the pivot axis and being configured to maintain the first endplate position independent of wing member position; and
   a second endplate pivotably coupled to the second end, the second endplate having a second endplate position relative to the pivot axis and being configured to maintain the second endplate position independent of wing member position.

10. The wing assembly of claim 9, further comprising:
  a first gearing assembly configured to cooperate with the wing member and the first endplate to maintain the first endplate position independent of wing member position; and
  a second gearing assembly configured to cooperate with the wing member and the second endplate to maintain the second endplate position independent of wing member position.

11. The wing assembly of claim 10, wherein the wing member includes a first plurality of teeth at the first end and a second plurality of teeth at the second end, wherein the first gearing assembly includes a first counter-sprocket in meshing engagement with the first plurality of teeth and a first driven sprocket in meshing engagement with the first counter-sprocket, the first driven sprocket being fixedly coupled to the first endplate, and wherein the second gearing assembly includes a second counter-sprocket in meshing engagement with the second plurality of teeth and a second driven sprocket in meshing engagement with the second counter-sprocket, the second driven sprocket being fixedly coupled to the second endplate.

12. The wing assembly of claim 9, further comprising a first mass coupled to the first endplate and a second mass coupled to the second endplate, wherein the first endplate is pivotable independent of wing member position and the first mass is offset from the pivot axis to maintain the first endplate in the first endplate angular position, and wherein the second endplate is pivotable independent of wing member position and the second mass is offset from the pivot axis to maintain the second endplate at the second endplate angular position.

13. The wing assembly of claim 9, further comprising a first electric motor having a first output shaft coupled to the first endplate and a second electric motor having a second output shaft coupled to the second endplate, wherein the first endplate is pivotable independent of wing member position and the first motor is configured to maintain the first endplate in the first endplate angular position, and wherein the second endplate is pivotable independent of wing member position and the second motor is configured to maintain the second endplate at the second endplate angular position.

14. The wing assembly of claim 9, wherein the wing member is pivotably coupled to a stanchion disposed at a rear portion of an automotive vehicle.

15. A vehicle comprising:
  a vehicle body having a driver side, a passenger side, and a lateral axis extending from the driver side to the passenger side;
  a stanchion coupled to the body;
  an elongate aerodynamic wing member pivotably coupled to the stanchion;
  a first endplate pivotably coupled to the wing member about a first pivot axis generally parallel to the lateral axis, the first endplate being spaced from the body; and
  a second endplate pivotably coupled to the wing member about a second pivot axis generally parallel to the lateral axis, the second endplate being spaced from the body.

16. The vehicle of claim 15, wherein the first pivot axis is coaxial with the second pivot axis.

17. The vehicle of claim 15, wherein the first endplate extends in a first plane generally orthogonal to the first pivot axis and the second endplate extends in a second plane generally orthogonal to the second pivot axis.

18. The vehicle of claim 15, wherein the first endplate has a predefined first angular position relative to the first pivot axis and is configured to maintain the first angular position as the wing member pivots relative to the first pivot axis, and the second endplate has a predefined second angular position relative to the second pivot axis and is configured to maintain the second angular position as the wing member pivots relative to the second pivot axis.

19. The vehicle of claim 18, further comprising:
  a first gearing assembly coupling the wing member to the first endplate, the first gearing assembly being configured to maintain the first endplate at the first angular position as the wing member pivots relative to the first pivot axis; and
  a second gearing assembly coupling the wing member to the second endplate, the second gearing assembly being configured to maintain the second endplate at the second angular position as the wing member pivots relative to the second pivot axis.

20. The vehicle of claim 15, wherein the vehicle is an automotive vehicle.

* * * * *